United States Patent [19]
Egerer et al.

[11] 3,885,819
[45] May 27, 1975

[54] COMPRESSED AIR HOSE CONNECTION

[76] Inventors: Herbert Egerer, 4002 S. 89th St., Omaha, Nebr. 68131; Donald W. Carlson, 8900 F. St., Omaha, Nebr. 68107

[22] Filed: Nov. 21, 1972

[21] Appl. No.: 308,403

[52] U.S. Cl. .................................. 285/93; 285/255
[51] Int. Cl. ............................................. F16l 35/00
[58] Field of Search ....... 285/23, 93, 255, 331, 242, 285/256, 259

[56] References Cited
UNITED STATES PATENTS

| | | | |
|---|---|---|---|
| 186,855 | 1/1877 | Leland | 285/255 |
| 2,248,576 | 7/1941 | McConnohie | 285/259 X |
| 2,786,696 | 3/1957 | Feldmeier | 285/93 X |

FOREIGN PATENTS OR APPLICATIONS

| | | | |
|---|---|---|---|
| 506,941 | 12/1954 | Italy | 285/242 |
| 959,013 | 9/1949 | France | 285/242 |

*Primary Examiner*—Dave W. Arola
*Attorney, Agent, or Firm*—Hiram A. Sturges

[57] ABSTRACT

A hose connection fitting assembly having a nipple for receiving a hose provided with an enlarged portion, the backside of which is provided with ridges, a ring engaging the outside of the hose and having interior ridges, manually releasable means holding the ring on the nipple prior to its movement into a hose-holding position.

5 Claims, 10 Drawing Figures

PATENTED MAY 27 1975 3,885,819

SHEET 1

COMPRESSED AIR HOSE CONNECTION

FIELD OF THE INVENTION

This invention is in the field of hose connection fitting assemblies for compressed air and for use with gases and liquids of all types which are under pressure.

DESCRIPTION OF THE PRIOR ART

The prior art has lacked a hose fitting assembly which combines in the same product the advantages of low cost manufacture, ability to be shipped and handled as a unit prior to placement on a hose, ease of fitting to a hose manually, ease of production assembly manually, a reusable ring of great rigid strength for withstanding damaging situations such as being run over by a fork-lift in a factory, capability of withstanding high pressures without leaking, yet acting also as a swivel-fitting on which a hose can be rotated without leaking, and capability of being manufactured out of many desirable materials without limitation to the manufacture of the ring out of malleable brass, as has been the characteristic of prior art rings of the type which are applied by crimping, and which are, therefore, made of material which is inherently weak.

In the prior art expensive swivel fittings have been necessary to take a twist out of a hose after it has been connected into place. Such swivel fittings are especially expensive because they must withstand high compressed air pressures. It would be desirable if such fittings were no longer needed.

A further problem in the prior art has been that rings used opposite nipples to hold hoses have tended to become accidentally loosened by accidental blow thereagainst during use, such loosening causing leakage.

SUMMARY OF THE INVENTION

A fitting assembly for hose connection comprising a nipple having an enlarged portion with an annular backside surface section facing partially away from the terminal end of the nipple, the backside surface section having annular ridges thereon having sharp edges facing away from the terminal end, an annular ring surrounding the nipple and having internal ridges thereon having sharp edges facing away from the terminal end of the nipple, the nipple having ring-receiving means thereon for receiving the ring during storage and shipping and for maintaining the ring in assembly with the nipple and allowing the ring to be removed therefrom by manual pressure for movement to a position for holding a hose.

The ring-retaining means comprising a piece of thermoplastic material having a relative amount of flexibility and stiffness desirable for making it possible that the ring be both held thereon and removable manually therefrom in the case in which the ring is formed of stiff and hard metal, although the composition of the ring need not be of metal so long as the materials of the ring and of the ring-holding means are sufficiently rigid and sufficiently flexible in their relative totality such that the ring is held by the ring-holding means during shipping but is releasable therefrom by manual pressure.

The fitting assembly described in which the ring-holding means is an annular cap member of substantial flexibility and formed, for example, of thermo-plastic material whereby all of the flexibility needed for the above described results can be accomplished by means of the flexibility of the cap only so that the ring and the nipple can both be formed of hard metal, although a characteristic of the invention is that all parts thereof could be made of either plastic or of metal.

The combination described in which the taper with respect to the axis of the nipple of outermost portions of the backside of the enlarged portion and of innermost portions of the ring are of the same inclination with respect to the axis of the nipple, and in which the ridges of the ring and the ridges of the nipple protrude equal distances from the respective nipple and ring.

Advantages of the fitting of this invention are that it can achieve, all in one fitting, all of the advantages described as desirable in the above description of the prior art.

The connection fitting assembly described has a portion against which the end of the hose abuts and which overlaps the end of the hose, the overlapping portion being transparent so that an operator can see through it to ascertain when the hose has been fully inserted onto the nipple to the position of abutting the abutment portion.

A particular object is to provide a fitting as described which will allow the hose to be twisted with respect thereto without leakage of high compressed air pressure so that workers, after assembling a hose, can simply twist the hose for alignment whenever needed.

Another object is to provide the ring with a tapered outer surface so that it has a narrow end adjacent the terminal end of the nipple so that a blow is less likely to solidly hit its narrower end and is more likely to glance off, whereby accidental blows are less likely to loosen the assembly by striking the ring than has been the case in the prior art.

DESCRIPTION OF THE PREFERRED EMBODIMENT

Figure 1:
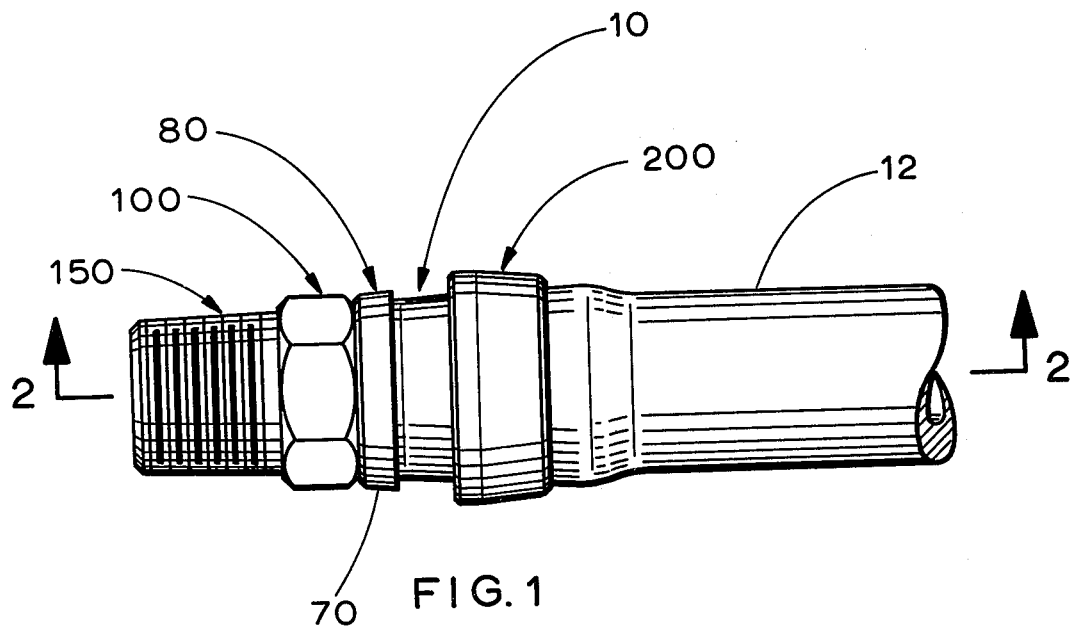
FIG. 1 is a side elevation of the hose connection fitting assembly of this invention shown with the end portion of a hose mounted thereon in a position for resisting pressure in the hose, the remaining portion of the hose being broken away.

The hose connection fitting assembly of this invention is generally indicated at 10 in FIG. 1 and is for receiving a hose 12 thereon.

The assembly 10 has an annular nipple generally indicated at 20 having a passage 22 therethrough extending from a terminal end 24 thereof to an opposite end 26.

The nipple 20 has an axis 30 extending through at least a portion of the passage 22 beginning at the terminal end 24. The nipple 20 has an enlarged annular exterior surface portion 38 disposed between its ends and surrounding the axis 30 symmetrically. The enlarged surface portion 38 is generally spaced a greater distance from the axis 30 than other portions 42 and 44 of the nipple 20 which are adjacent to the enlarged portion 38.

Figure 2:
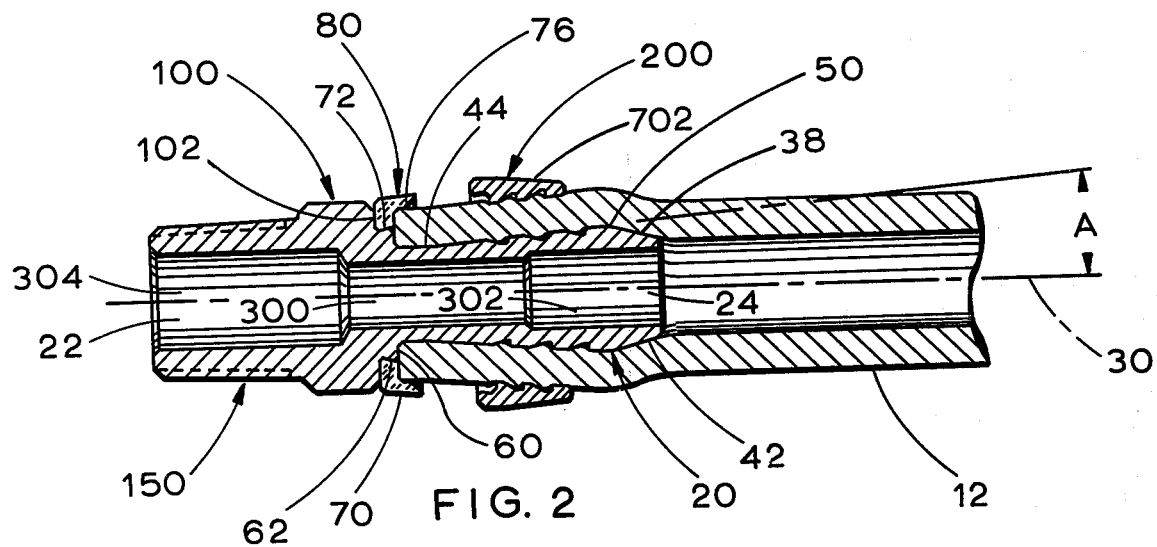
FIG. 2 is a sectional view taken along the line 2—2 of FIG. 1.
Figure 3:
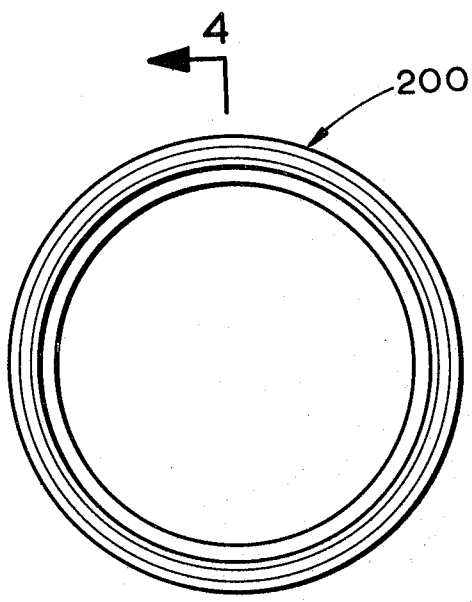
FIG. 3 is an end view of the ring portion of the fitting assembly.
Figure 4:
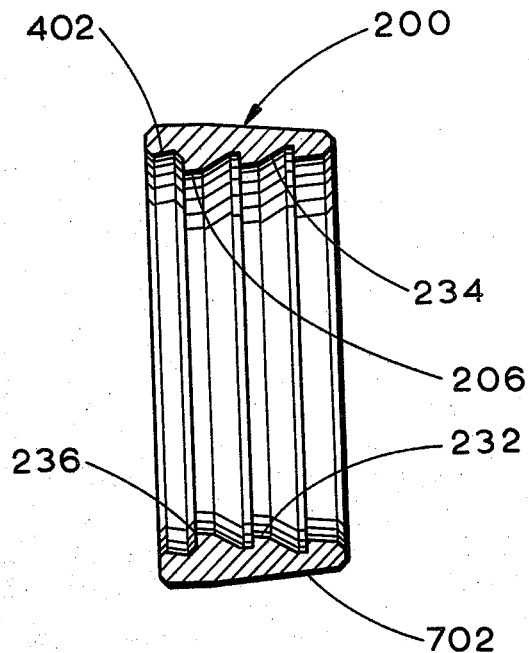
FIG. 4 is a sectional view taken along the line 4—4 of FIG. 3.
Figure 5:
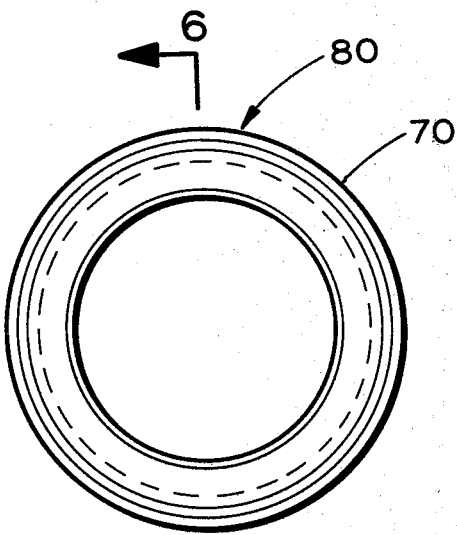
FIG. 5 is an end view of a transparent cap of the assembly.
Figure 6:
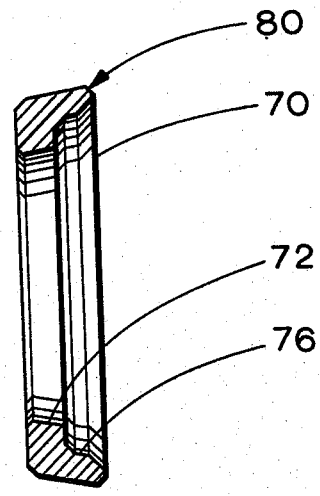
FIG. 6 is a sectional view taken along the line 6—6 of FIG. 5.
Figure 7:
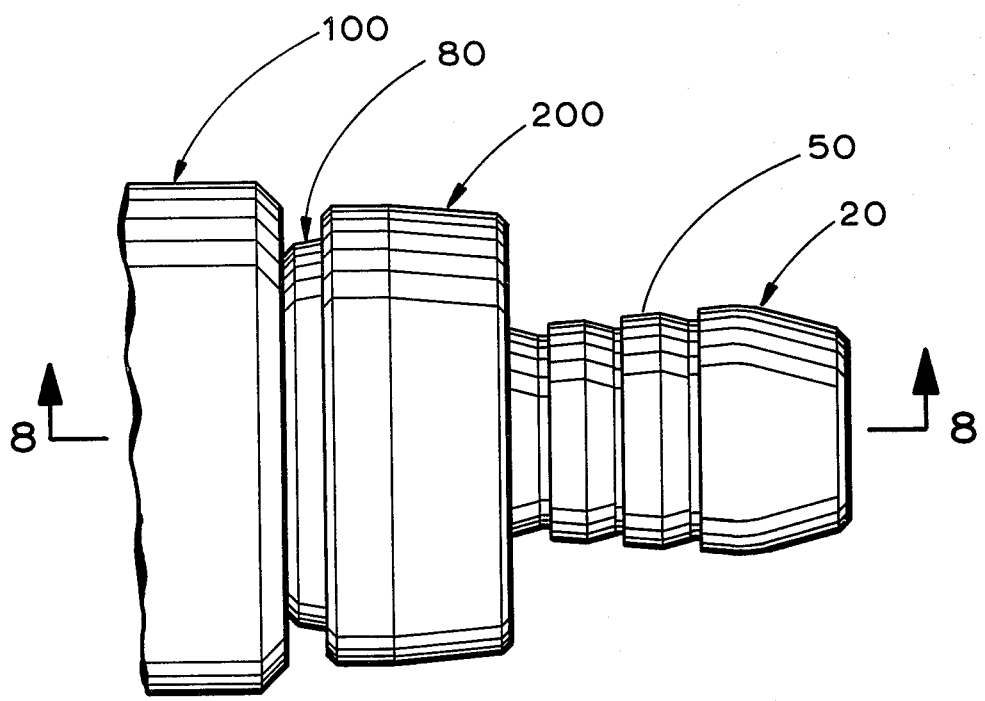
FIG. 7 is an enlarged view of the assembly with its left-hand end broken away and showing its ring in a storage position for shipping.

The enlarged portion 38 has an annular backside surface section 50 on its side which faces partially away from the terminal end 24 and which faces partly away from the axis 30, the backside surface 50 being inclined with respect to the axis 30 such that its outermost portion defines an angle A with respect to the axis 30, as best seen in FIG. 2, which is an angle of approximately 5°.

The backside surface section 50 generally gradually tapers from a larger diameter end at that one of its ends which is nearest the terminal end 24 to a lesser diameter at its opposite end.

The hose 12 can be passed over the terminal end 24 until it strikes an abutment flange 60 which latter is attached to and is preferably integral with the nipple 20 and protrudes from the outerside of the nipple on all sides of the nipple away from the axis 30.

The abutment flange 60 is disposed on the opposite side of the enlarged portion 38 from the terminal end 24 and is for the purpose of limiting movement of the hose onto the nipple.

The abutment flange 60 is annular and is provided with an exterior surface 62, which latter faces away from the axis 30 and which is inclined from a larger diametered portion adjacent the terminal end 24 to a smaller diametered portion at its other end, the surface 62 being annular and surrounding the axis 30 and being symmetrical therewith.

The abutment flange 60 receives thereagainst a transparent cap 70, which latter has an annular innermost surface portion 72 of annular shape and disposed in parallelism with and in abutment with the exterior surface 62 of the abutment flange 60. Since the surface 72 is parallel to the surface 62, with both inclining with respect to the axis 30, as described, therefore, the cap 70 cannot move off of the flange 60 toward the terminal end 24.

The cap 70 further has an annular ledge 76 protruding from that side thereof which faces the terminal end 24 and spaced farther from the axis 30 than those certain adjacent portions of the remainder of the outer surface of the nipple 20, which latter portion can be seen at the numeral 44 in FIG. 2. This spacing is so that the hose 12 can be received between the ledge 76 and the adjacent outer surface portion 44 of the nipple 20. The hose is shown in this position in FIG. 2 in abutment not only with the flange 60 but with the cap 70.

The abutment flange 60 and the abutment cap 70 can be referred to together as an abutment assembly generally indicated at 80.

The cap 70 is sufficiently transparent that it is possible to see through it so that an operator can determine whether the hose 12 has been snugly put completely on the nipple into a position of abutment against the cap 70 and flange 60.

The nipple 20 is provided with blocking means generally indicated at 100 which can be a flange extending outwardly from the nipple, the blocking means 100 having a surface 102 which faces the terminal end 24 and which latter is adapted to engage that side of the cap 70 which is disposed opposite the terminal end 24 in order to prevent the cap 70 from moving off of the abutment flange 60 in a direction opposite from the terminal end 24.

Therefore, it can be said that the blocking means 100 overlaps the adjacent side of the cap 70.

In a sense, the abutment flange 60 can also be called an inner abutment means portion 60 or inner abutment flange means portion 60.

Figure 8:
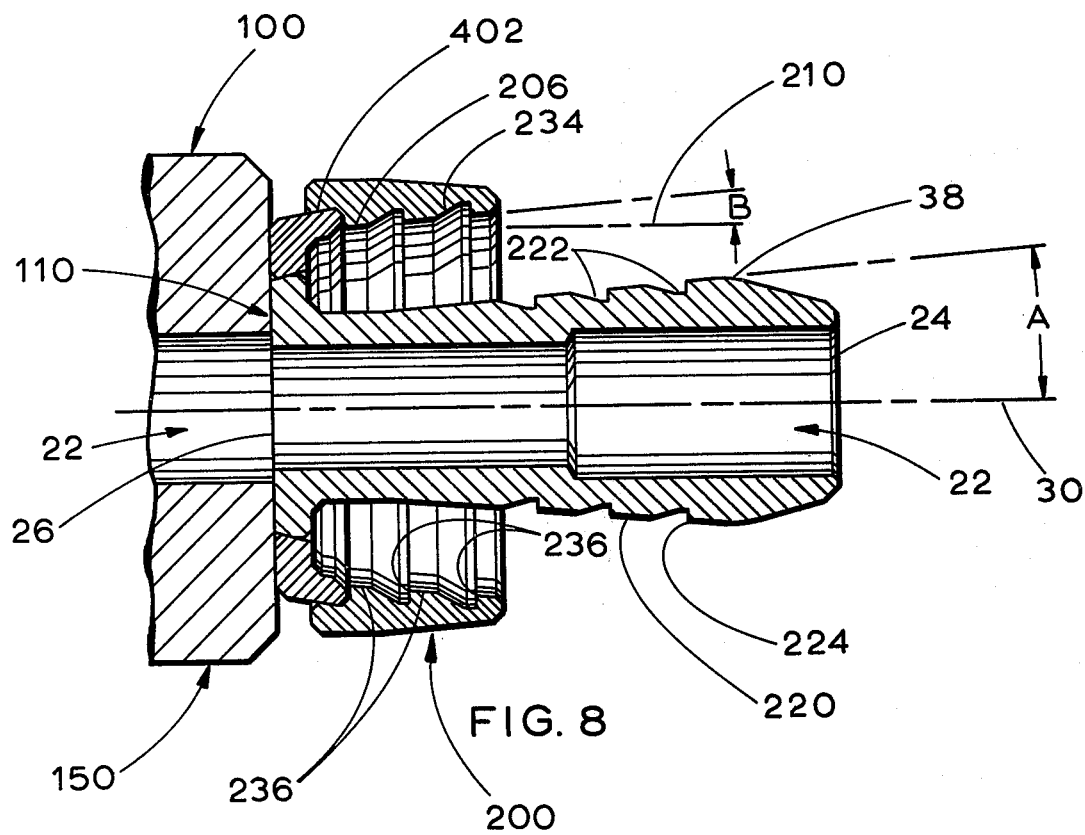
FIG. 8 is a sectional view taken along the line 8—8 of FIG. 7.
Figure 9:
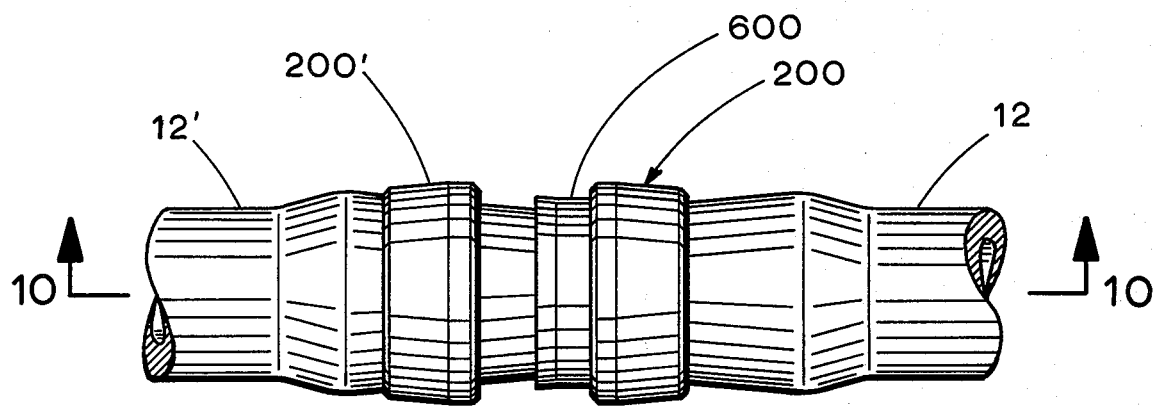
FIG. 9 is a side elevation of a modified hose connection fitting assembly of this invention of the type used to couple two hoses together, end portions of two hoses being coupled being also shown with all parts shown in the hose-holding position.

A preferred way of assembling is to have the blocking means 100 formed of a separate piece of material than the cap 70 and abutment flange 60, all as seen in FIG. 8, in which the blocking means member 100 is bonded at 110 to adjacent surface of the abutment flange 60 which latter is disposed transverse to and preferably in a plane at a 90° angle to the axis 30. With such construction, the bonding of the blocking means 100 to the adjacent end of the abutment flange 60 is accomplished by any suitable means, such as resistance welding, brazing, spin-welding, or chemical bonding, or other suitable means.

Referring to FIG. 8, it will be seen that the blocking means 100 has a portion of a passage 22 extending therethrough and it can be stated that the blocking means 100, thus defined in FIG. 8, can be considered to be those parts of the assembly which are disposed to the left of the bonded connection between the blocking means and the adjacent end of the abutment flange 60, and further can be considered to represent possibly one end of a male fitting such as the externally threaded male fitting 150 shown in FIG. 2 which can also be considered a left-hand end of the nipple 20, or the blocking means of FIG. 8 could also be a female pipe fitting, only a portion of which is being shown in FIG. 8, or it could be any one of the following elements, only a portion of which are shown in FIG. 8: a quick disconnect coupler, a pipe, a portion of another hose nipple, a part of a machine or other device.

Figure 10:
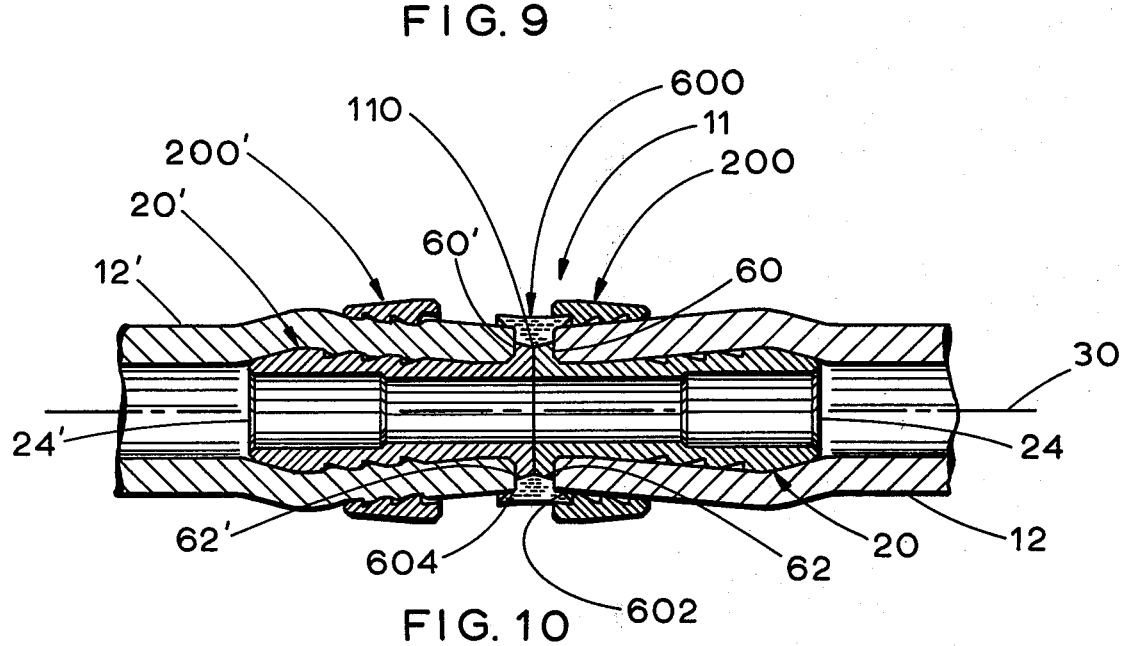
FIG. 10 is a sectional view taken along the line 10—10 of FIG. 9.

The example in which the blocking means 100 is a portion of a double-nipple coupler assembly is shown in FIG. 10 and will be later described.

Referring to FIG. 2, a ring is there shown at 200 and it is an annular element symmetrical with the axis 30 and is adapted to be disposed opposite the backside surface section 50 of the enlarged portion 38 of the nipple, with a portion of the hose therebetween and compressed against the backside surface section by the ring 200.

The ring 200 can be seen in FIG. 8 to have an inner surface 206, the innermost portions of which are disposed approximately on a frustro-conical configuration, which latter has a smaller diametered portion on its end farthest from the terminal end 24 and a larger diametered portion on its end closest to the terminal end 24. The configuration on which innermost portions of the surface 206 lie is disposed on a 5° taper with respect to any line, such as the line 210, which is parallel with the axis 30, whereby an angle indicated at B in FIG. 8 is 5°, preferably. Because of this, innermost portions of the surface 206 lie in a configuration parallel to the outermost portions of the backside surface section 50 of the enlarged portion 38 of the nipple.

The nipple 20 can be seen to have its backside surface section 50 provided with a plurality of ridges 220 separated by grooves 222. Each ridge 220 has a sharp circular edge 224 on that side thereof which faces away from the terminal end 24 to grip into the flexible hose 12 to assist in gaining an airtight fit under high pressure.

Similarly, the ring 200 can be seen in FIG. 8 to have its innermost surface 206 provided with a plurality of ridges 232 separated by grooves 234.

The height of the ridges 232 of the ring are preferably equal to the height of the ridges 220 of the nipple for good cooperative interaction in the impingement of the hose therebetween in a high pressure manner for airtight fit.

Each of the ridges 232 of the ring is provided with a sharp edge 236 on that side thereof which faces away from the terminal end 24 in order to grip into the flexible hose 12 to assist an airtight high pressure fit.

As best seen in FIG. 2, the ridges 232 of the ring 200 are preferably of equal spacing along the axis 30 with respect to the ridges 220 of the nipple 24. In another sense, at least two of the ridges 232 of the ring 200 can be of complementary shape to at least two of the grooves 222 of the nipple 20.

Referring to FIG. 2, it will be seen that the passage 22 can have a smaller diametered central portion 300 with larger diametered counterbored portions 302 and 304 on each of its ends.

Referring to FIG. 8, it will be seen that the ring 200 has an annular notch or concave wall surface 402 on its inner side and on its end opposite the terminal end 24, the concave wall surface 402 being adapted to snugly receive an adjacent outer end portion of the cap 70 and forming a press-fit therewith, whereby the ring 200 can be pressed manually on to the cap and will hold thereon during shipping, but can be disconnected from the cap by manually pressing the ring in the direction of the terminal end 24 preparatory to assembly on a hose, this being done after the hose has been placed on the nipple.

The press-fit is accomplished by having the concave wall surface 402 facing the axis 30 and inclining in a frustro-conical configuration to a larger diameter adjacent the end thereof which is closest to the terminal end 24 and by having the cap 70 provided on its surface which is farthest from the axis 30 with an inclined frustro-conical surface which has its larger diameter also toward that end thereof which is closest to the terminal end 24, the taper being slight enough to accomplish the press-fit purposes.

The abutment assembly 80 has its outermost portion, which is the abutment cap 70, preferably formed of a thermo-plastic material, whereby the ring 200, which is preferably formed of a material such as steel of great rigid strength, can still have a press-fit because of the flexing or yielding nature of the plastic cap 70.

However, it will also be seen that if the entire abutment assembly 80, including its outermost part, were formed of a rigid material, then the ring itself could have a press-fit therewith by the formation of the ring from a thermo-plastic material of some flexibility. It is much preferable that the ring be stiff and strong enough to withstand, for example, being run over by a factor fork-lift truck without damage to the ring.

The abutment flange 60 and the abutment cap 70 heretofore called an abutment assembly 80 can, therefore, also be called a ring-holding means 80 since these same parts have this double function.

The nipple 20 can itself be formed of either thermoplastic material or any metal or other material. The nipple 20 must, however, have sufficient stiffness to serve its purpose and this can also be said of the cap and ring.

Referring now to FIG. 10, a fitting assembly is there shown at 11 in which all parts similar to the fitting assembly 10 of FIG. 1 can be given the same numbers and are similarly described. However, in the fitting assembly 11 a special abutment cap is there shown at 600 which has ledges 602 and 604 facing in opposite directions. The cap 600 is transparent for seeing therethrough a hose 12 and a hose 12' each disposed under a different ledge 602 and 604.

The fitting assembly 11 of FIG. 10 is a doublenipple assembly such as can be used in hose mending and has a nipple 20 and a nipple 20', each nipple having an abutment flange 60 or 60' and each nipple having a terminal end 24 or 24', the opposite ends of each nipple 20 and 20' being attached together by suitable bonding means 110 which can be any one of the bonding means described above under the numeral 110.

The nipples 20 and 20' have their terminal ends 24 and 24' facing in opposite directions and they have a common axis 30.

The outermost surfaces 62 and 62' of the abutment flanges 60 and 60' incline in opposite directions serving to combine to form a concave surface against which a convex terminal surface of the double cap 600 is disposed, the cap 600 being similar to the snapping in place of the surface portion 72 of the cap 70 onto the surface 62 of the flange 60.

The ring 200 in FIG. 2 has an outer surface 702 of frustro-conical shape and of lesser diameter on the end closest to the terminal end 24. This is important because an blows accidentally hitting the ring on that end thereof which protrudes the most will only cause the hose fitting to be more tight, and yet any blows on the outer surface 702 which are partially in the direction away from the terminal end 24 will tend to glance off of the surface 102 instead of hitting the ring on the end nearest the terminal end 24 of the nipple, which latter would cause the ring to move in a loosening direction resulting in an accidental loosening.

Therefore, the ring 200 is shaped to prevent it from being loosened by accidental blows to the maximum extent practical.

As thus described, it will be seen that the hose fittings are used by simply sliding the hoses over the nipples at a time when the rings 200 are held on the caps. Thereafter, the rings are slid out into place as shown in FIG. 2 in which position the greater a pull on the hose occurs, the more locking pressure the ring will exert for holding the hose in place.

It will be seen that the outermost portions or terminal ends of the nipple ridges 220 lie on a configuration tapered generally from being farther from the axis 30 at the terminal end of the nipple 20 to closer to the axis at the opposite end of the nipple. Also, terminal ends of the nipple ridges 220 and terminal ends of the ring ridges 232 lie on configurations disposed in approximate parallelism with each other, such configurations both being tapered with respect to the axis 30 by an amount greater than approximately 5°.

This invention provides a leak-proof fitting which will withstand great mechanical pull on the hose without separating, and yet still allowing a rotation of a hose on its nipple without leakage so that expensive swivel fittings are no longer needed. Workers can simply twist the hose into a desired alignment after assembly of the fitting.

We claim:

1. A hose fitting assembly comprising an annular nipple for receiving a hose therearound and having a passage therethrough extending from a terminal end thereof, said nipple having an axis extending through at least a portion of said passage beginning at said terminal end, said nipple having an enlarged annular exterior surface portion disposed between its ends and surrounding said axis, said enlarged surface portion being generally spaced a greater distance from said axis than other portions of the exterior of said nipple adjacent to said enlarged portion, said enlarged portion having an outer surface facing away from said axis which has an annular backside surface section facing partially away from said terminal end and inclined with respect to said axis, said backside surface section generally gradually tapering from a larger diameter at that end of said backside surface which is nearest said terminal end to a lesser diameter at its opposite end, and in which an abutment means is attached to said nipple and protrudes from said nipple away from said axis, said abutment means being disposed on the opposite side of said enlarged portion from said terminal end for receiving an end of said hose thereagainst to limit movement of said hose onto said nipple, said abutment means being annular and surrounding and being attached to the remainder of said nipple all around said axis, said abutment means having an annular ledge protruding from that side thereof which faces said terminal end of said nipple, said ledge being spaced farther from said axis than those certain adjacent portions of the remainder of the outer surface of said nipple which latter portions are disposed toward said terminal end for the reception of an end of said hose between said ledge and said certain adjacent surface portions of said nipple, and in which said ledge is transparent enough so that an operator can see the end of said hose therethrough.

2. A hose fitting assembly comprising an annular nipple for receiving a hose therearound and having a passage therethrough extending from a terminal end thereof, said nipple having an axis extending through at least a portion of said passage beginning at said terminal end, said nipple having an enlarged annular exterior surface portion disposed between its ends and surrounding said axis, said enlarged surface portion being generally spaced a greater distance from said axis than other portions of the exterior of said nipple adjacent to said enlarged portion, said enlarged portion having an outer surface facing away from said axis which has an annular backside surface section facing partially away from said terminal end and inclined with respect to said axis, said backside surface section generally gradually tapering from a larger diameter at that end of said backside surface which is nearest said terminal end to a lesser diameter at its opposite end, a ring surrounding said nipple, a ring-holding means attached to said nipple and receiving said ring thereon in a press-fit such that said ring can be removed from said holding means by manual pressure for freeing said ring for placement of said ring into a position for holding a hose, said ring-holding means being disposed on the opposite side of said enlarged portion from said terminal end.

3. The fitting assembly of claim 2 further comprising an abutment means attached to said nipple and protruding from said nipple away from said axis, said abutment means being disposed on the opposite side of said enlarged portion from said terminal end for receiving an end of said hose thereagainst to limit movement of said hose onto said nipple, said abutment means being annular and surrounding and being attached to the remainder of said nipple all around said axis, said abutment means having an annular ledge protruding from that side thereof which faces said terminal end of said nipple, said ledge being spaced farther from said axis than those certain adjacent portions of the remainder of the outer surface of said nipple which latter portions are disposed toward said terminal end for the reception of an end of said hose between said ledge and said certain adjacent surface portions of said nipple, and in which said abutment means has an inner portion having an outer surface facing away from said axis, a cap defining an outer portion of said abutment means which is farther from said axis than said inner portion of said abutment means, said cap surrounding said nipple at said inner abutment means portion, said cap having an inner surface which tightly engages said outer surface of said inner abutment means portion, said ledge being a part of said cap, the opposed surfaces of said inner portion of said abutment means and of said cap being so shaped that said cap cannot be moved toward said terminal end of said nipple and away from said attached portion of said abutment means, blocking means which is attached to that end of said nipple which is opposite said terminal end of said nipple, said blocking means extending outwardly from said axis in a position for overlapping said side of said cap which is opposite said terminal end of said nipple so that said blocking means blocks said cap from moving off of said inner portion of said abutment means in a direction opposite from said terminal end, said cap and said inner abutment means portion forming two parts of a special assembly of which at least one part is sufficiently flexible and resilient that said cap is connectable onto said inner abutment means portion by a press-fit sliding of said cap over that edge of said inner abutment means portion which is disposed closest to said terminal end of said nipple, said abutment means and said cap forming parts of said ring-holding means.

4. The fitting assembly of claim 2 further comprising said ring-holding means being substantially more soft and resilient than said ring.

5. The combination described in claim 2 in which said hose fitting assembly is combined with a second similar hose fitting assembly to form a coupler for receiving two hoses respectively, means attaching the said opposite ends of the respective nipples of said assemblies together, and in which a portion of said blocking means of each of said hose assemblies is integral with the cap means of the other hose fitting assembly.

* * * * *